United States Patent
Schollier

(10) Patent No.: US 12,104,318 B2
(45) Date of Patent: Oct. 1, 2024

(54) POLYESTER CARPET TILE OR CARPET STRIP AND METHOD FOR MANUFACTURING A POLYESTER CARPET TILE OR CARPET STRIP

(71) Applicant: DE POORTERE DECO SA, Mouscron (BE)

(72) Inventor: Bert Schollier, Mouscron (BE)

(73) Assignee: DE POORTERE DECO SA, Mouscron (BE)

(*) Notice: Subject to any disclaimer, the term of this patent is extended or adjusted under 35 U.S.C. 154(b) by 35 days.

(21) Appl. No.: 17/754,857

(22) PCT Filed: Oct. 16, 2020

(86) PCT No.: PCT/EP2020/079239
§ 371 (c)(1),
(2) Date: Apr. 14, 2022

(87) PCT Pub. No.: WO2021/074395
PCT Pub. Date: Apr. 22, 2021

(65) Prior Publication Data
US 2024/0093428 A1 Mar. 21, 2024

(30) Foreign Application Priority Data
Oct. 17, 2019 (BE) .................. 2019/5714

(51) Int. Cl.
*B32B 5/26* (2006.01)
*A47G 27/02* (2006.01)
(Continued)

(52) U.S. Cl.
CPC ........... *D06N 7/0068* (2013.01); *A47G 27/02* (2013.01); *B32B 5/022* (2013.01); *B32B 5/024* (2013.01);
(Continued)

(58) Field of Classification Search
CPC ...................................... B32B 5/275
See application file for complete search history.

(56) References Cited

U.S. PATENT DOCUMENTS 3,719,546 A * 3/1973 Parlin ............... B32B 5/26
442/100
2003/0031825 A1* 2/2003 Barkis ............... D03D 27/00
428/95

(Continued)

FOREIGN PATENT DOCUMENTS

EP 0176346 A2 4/1986
EP 1533114 A2 5/2005
(Continued)

OTHER PUBLICATIONS

ISR-WO dated Dec. 11, 2020 for parent application PCT/EP2020/079239 (with ISR translation).

*Primary Examiner* — Andrew T Piziali
(74) *Attorney, Agent, or Firm* — Vorys, Sater, Seymour and Pease LLP

(57) ABSTRACT

The present invention relates to a carpet tile or carpet strip which is suitable for the contract market, more particularly office or commercial buildings, comprising a machine or mechanically woven carpet, comprising warp and weft yarns, a needle felt, an intermediate layer between the needle felt and the machine or mechanically woven fabric, wherein a part of the warp yarns on the back side of the machine or mechanically woven fabric have at least partially fused together. The invention also relates to a method for the manufacture of a carpet tile or carpet strip which is suitable for the contract market, in particular office and commercial buildings.

15 Claims, 2 Drawing Sheets

(51) Int. Cl.
  *B32B 5/02* (2006.01)
  *B32B 7/12* (2006.01)
  *B32B 27/12* (2006.01)
  *B32B 27/36* (2006.01)
  *B32B 37/20* (2006.01)
  *B32B 38/00* (2006.01)
  *D06M 17/04* (2006.01)
  *D06N 7/00* (2006.01)
  *D06M 101/32* (2006.01)

(52) U.S. Cl.
  CPC ............... *B32B 5/275* (2021.05); *B32B 7/12* (2013.01); *B32B 27/12* (2013.01); *B32B 27/36* (2013.01); *B32B 37/203* (2013.01); *B32B 38/0004* (2013.01); *D06M 17/04* (2013.01); *B32B 2255/02* (2013.01); *B32B 2255/26* (2013.01); *B32B 2262/0276* (2013.01); *B32B 2305/188* (2013.01); *B32B 2305/28* (2013.01); *B32B 2307/3065* (2013.01); *B32B 2367/00* (2013.01); *B32B 2471/02* (2013.01); *D06M 2101/32* (2013.01); *D06N 2201/02* (2013.01); *D06N 2209/067* (2013.01)

(56) References Cited

U.S. PATENT DOCUMENTS

| | | | |
|---|---|---|---|
| 2005/0255775 A1* | 11/2005 | Sultan | B32B 17/04 442/212 |
| 2009/0233040 A1 | 9/2009 | Baumgartner | |
| 2010/0000623 A1* | 1/2010 | Makida | D04B 21/02 66/194 |
| 2013/0302556 A1* | 11/2013 | Vogel | D06N 7/0068 156/72 |
| 2016/0326401 A1* | 11/2016 | Ikebata | C09J 7/22 |
| 2021/0372042 A1* | 12/2021 | Kniss | D06N 7/0063 |

FOREIGN PATENT DOCUMENTS

| | | |
|---|---|---|
| EP | 3192906 A1 | 7/2017 |
| EP | 3196344 A1 | 7/2017 |
| EP | 3199678 A1 | 8/2017 |
| JP | 2000-282347 A | 10/2000 |
| JP | 2000-308604 A | 11/2000 |
| JP | 2005-152159 A | 6/2005 |
| JP | 2012097373 A | 5/2012 |
| WO | 2005/113229 A2 | 12/2005 |
| WO | 2012076348 A2 | 6/2012 |
| WO | 2021/074395 A1 | 4/2021 |

\* cited by examiner

the foam base layer comprises a backing material and a high density foam, laminated to the backing material.

JP 2000 308604 describes a base fabric for a dust control carpet.

JP 2000 282347 describes a pile carpet.

JP 2005 152159 describes a woven carpet.

WO 2005/113229 describes a hybrid of vinyl flooring and soft padded carpet.

EP 3 192 906 describes a fray-resistant carpet with fusible threads.

WO 2012/076348 describes a process for manufacturing a textile product and the resulting textile product.

EP 3 196 344 describes a fray-resistant carpet with natural yarns.

EP 0 176 346 has a number of disadvantages. In the case of such a carpet tile, the primary carpet base comprises a tufted or bonded carpet in which the pile yarns are bonded in a PVC adhesive or by fusion. When cutting to size or cutting shapes in a carpet tile during installation, the layer gathering the pile yarns is damaged at the cutting edge in both tufted and bonded carpet. Some pile yarns come loose at the edge and the carpet tile frays at the cutting edge. This causes visible joints and damage to the carpet tile.

The use of pile yarns provides a thick and pleasant primary carpet base. The disadvantage is that pile yarns are less suitable for use in circumstances where the carpet is heavily loaded, such as in office and commercial buildings. Pile yarns wear out quickly as a result of frequent walking on the carpet and make it difficult to use trolleys to carry files, for example.

The foam base layer and the use of thermoplastic material result in a carpet tile according to EP 0 176 346 which is heavy. Only these two layers together can provide a carpet tile with a weight of 2900 g/m². This is a heavy load for a raised floor. The use of a foam base layer comprising a support material and a thermoplastic material with an integrated layer of stabilising material, in which different materials are used, makes it difficult to recycle carpet tiles. This is a great disadvantage considering that carpet tiles in office and commercial buildings are often replaced. Tufting or binding of pile yarns potentially makes the recycling of pile yarns complex or partially impossible.

Finally, a foam base layer is highly flammable, making it less suitable for use in office and commercial buildings.

The present invention aims to provide a solution to these drawbacks.

POLYESTER CARPET TILE OR CARPET STRIP AND METHOD FOR MANUFACTURING A POLYESTER CARPET TILE OR CARPET STRIP

TECHNICAL AREA

The invention relates to a carpet tile or carpet strip which is suitable for the contract market, in particular office and commercial buildings.

In a second aspect, the invention also relates to a method for the manufacture of a carpet tile or carpet strip suitable for the contract market, in particular office and commercial buildings.

STATE OF THE ART

Carpets are well known as floor coverings and are often used as floor coverings in large areas of office and commercial buildings. It is usual to provide carpet tiles or carpet strips. Carpet tiles are cut into rectangles or squares and are attached to a floor surface in place in a juxtaposed manner. In some cases, carpet strips are obtained by cutting wider carpet rolls lengthwise. The carpet strips are unrolled on site in a side-by-side fashion on a floor surface. Often it is necessary to cut the carpet tiles or carpet strips to size on site. This is necessary, for example, when installing carpet tiles or carpet strips in corners or at the edges of a room. In office or commercial buildings, it is not unusual to cut out shapes in a carpet tile or carpet strip during or after installation. This may be necessary, for example, when a socket or additional network access is to be installed in a floor area, for which a recess is required in a carpet tile or carpet strip.

Carpet tiles and carpet strips in office and commercial buildings are heavily loaded. Every day, many people walk on carpet tiles or carpet strips. This requires that carpet tiles or carpet strips for the contract market have a high wear resistance. The layout in office or commercial buildings can also change frequently. Spaces can be given other destinations. Carpet tiles or carpet strips can therefore preferably be easily installed, replaced and recycled.

Because of the flexible design of office or commercial buildings, a raised floor is often chosen above the actual floor surface. In the space between the real floor surface and the raised floor, there is room for all utilities. Because of this raised floor, it is recommended to use carpet tiles or light carpet strips to relieve the raised floor as much as possible. In addition, lightweight carpet tiles or carpet strips are more ergonomic for the installer to carry.

In office or commercial buildings, there are often strict requirements regarding fire safety, in which it is required that carpet tiles and carpet strips are fire resistant. Carpet tiles or carpet strips must at least meet the requirements for the Cfl-s1 classification according to the fire standard EN 13501-1 2007.

Other standards that must be complied with are EN 15114 for the determination of shear strength, EN 985 for the test method of office chairs, ISO 6356 for the tendency to form static electricity in textile and laminate floor coverings, ISO 2551 for the determination of dimensional changes due to varying water and heat conditions.

EP 0 176 346 describes a carpet tile. The carpet tile comprises a primary carpet base with pile yarns rising therefrom, a foam base layer beneath the primary carpet base, a thermoplastic material attaching the primary carpet base to the foam base layer, wherein the thermoplastic material has an integral layer of stabilising material and

SUMMARY OF THE INVENTION

In a first aspect, the present invention relates to a device according to claim 1.

The advantage of such a carpet tile or carpet strip is that some of the warp threads on the back side of the mechanically woven fabric have at least partially fused to each other. If the carpet tile or carpet strip is cut to size during installation or during the cutting of shapes in the carpet tile or carpet strip, at least some of the warp threads remain bound to each other, so that the strength of the carpet tile or carpet strip is maintained and the carpet tile or carpet strip frays less at the cutting edge. This advantage also applies when cutting carpet tiles or carpet strips during the production process.

A second advantage is that the fabric itself is already quite strong and has good dimensional stability, so that it frays less quickly under load as a result of repeated passage through the office or commercial building and by trolleys. The warp threads and therefore also the weft threads have a limited freedom of movement in relation to each other, which increases the wear resistance.

Because the fabric is already reinforced by the fusion joints, there is no need to use a heavy intermediate layer to reinforce the fabric and to laminate the fabric and needle felt. A lighter intermediate layer can be used to laminate only the fabric and the needle felt. This leads to a reduction in weight per unit area for the carpet tile or carpet strip. Since the glue does not have to be partially mixed with the warp and weft threads, it is easier to separate and recycle the fabric and needle felt.

In addition, the invention uses 100% thermoplastic flame retardant polyester (PES) for both the fabric and the needle felt. As a result, the carpet tile or carpet strip meets FAR 25.853 regarding flammability.

The carpet tile or carpet strip also meets at least the requirements for the Cfl-s1 classification according to the fire standard EN 13501-1 2007. An additional advantage is that, due to the use of only flame retardant polyester (PES), the recycling treatment of the fabric and the needle felt takes place simultaneously.

Preferred embodiments of the device are described in claims 2 to 9.

In a specific embodiment, the invention relates to a device according to claim 7. In the intermediate layer, PES is also used as an adhesive to laminate the fabric and the needle felt. This improves recycling even more. Now it is not even necessary to separate the fabric and the needle felt. The middle layer can even be processed and recycled together with the fabric and needle felt.

In a second aspect, the present invention relates to a method according to claim 10. Because, before the fabric and the needle felt are laminated, the fabric is led along a heated surface to at least partially melt a part of the warp threads at the back side of the mutually machine-woven or mechanically woven fabric, said method has among others the advantage that, when cutting to carpet tiles or carpet strips, the carpet tiles or carpet strips will fray less at the cutting edge. In addition, a fabric is obtained that is sufficiently strong and has dimensional stability. The fabric can be laminated to the needle felt with a light intermediate layer and the fabric and needle felt can easily be separated later for recycling.

Preferred embodiments of the device are described in dependent claims 11 to 15.

In a specific embodiment, the invention relates to a device according to claim 14. During the cutting to carpet tiles or carpet strips, a part of the warp and weft yarns have then at least partially fused to each other. This further strengthens the cutting edge and further reduces the fraying of the cutting edge.

In a third aspect, the present invention relates to the manufacture of a carpet tile or carpet strip according to the first aspect, using a method according to the second aspect.

DETAILED DESCRIPTION

Figure 1:
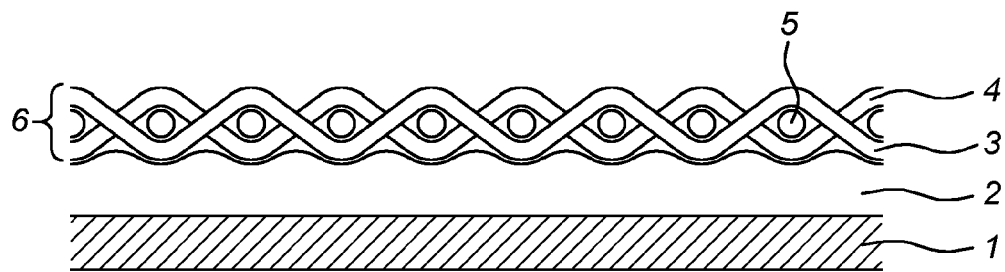
FIG. 1 shows a section of an embodiment of the present invention.

Unless otherwise stated, all terms used in the description of the invention, including technical and scientific terms, are used in the sense as generally understood by those skilled in the technical field of the invention. For a better judgment of the description of the invention, the following terms are explicitly explained.

"One", "a" and "the" refer in this document to both singular and plural unless the context clearly implies otherwise. "A segment" means, for example, one or more than one segment.

When "about" or "approximately" is used in this document, a measurable quantity, parameter, time or moment etc. means variations of +/−20% or less, preferably +/−10% or less, more preferably +/−5% or less, even more preferably +/−1% or less, and even more preferably +/−0.1% or less of the quoted value, as long as such variations apply to the above invention. However, the value of the quantity with which the term "about" or "approximately" is used, must itself be specifically expressed.

The terms "comprise", "composed of", "include", "provided for", "contain", "comprising", "containing", "including" are synonyms and are inclusive or open-ended terms indicating the presence of the following, and not excluding or precluding other components, features, elements, members, phases, known to or described in the prior art.

Quoting numerical intervals by means of endpoints includes all integers, fractions and/or real numbers between the endpoints, including these endpoints.

The term "thermoplastic" refers to a polymeric material that can be bent, kneaded or liquefied above a specific temperature and which substantially hardens after cooling. Examples of thermoplastic polymers include, but are not limited to, vinyl comprising thermoplastics: such as polyvinyl chloride, polyvinyl acetate, polyvinyl alcohol and other vinyl and vinylidene resins and copolymers thereof; polyethylene compounds: such as low density polyethylene and high density polyethylene and copolymers thereof; styrene compounds: such as ABS, SAN and polystyrenes and its copolymers, polypropylene and its copolymers; saturated and unsaturated polyesters; acrylic; polyamides; engineering plastics such as acetyl, polycarbonate, polyimide, polysulfon, polyphenylene oxide and sulfide resins and others.

The term "float" refers to a section of yarn appearing on the surface of a fabric. Floats may be upper floats and/or lower floats. The term "top float" refers to a section of yarn appearing on top of a fabric. A top float is formed by a binding pattern with a warp:weft binding density of 2:1, 3:1, 4:1, 5:1, 6:1, 7:1, 8:1, 9:1, 10:1 or more. This means that each weft thread floats over at least two warp threads, over at least 3 warp threads, etc. Alternatively, each warp thread floats above at least two weft threads, above at least 3 weft threads, etc. The term "bottom float" refers to a section of yarn appearing on the underside of a fabric. A bottom float is formed by a bonding pattern with a warp:weft bond density of 1:2, 1:3, 1:4, 1:5, 1:6, 1:7, 1:8, 1:9, 1:10 or less. This means that each weft yarn floats below at least two warp yarns, below at least 3 warp yarns, etc. Alternatively, each warp thread floats under at least two weft threads, under at least 3 weft threads, etc. The term "binding" is used to refer to the weaving of weft threads with warp threads to form a fabric.

The term "weft float" refers to a float formed by weft threads. The term "warp float" refers to a float formed by warp threads.

The yarn number refers to the thickness of the yarn. The measurement is indicated as the ratio between the weight and the length of a piece of yarn. In weight numbering, the weight of a fixed length of yarn is determined. In length numbering, the length of a fixed yarn weight is determined. Tex is an example of weight numbering, where tex indicates the weight in grams of 1000 m of yarn. Dtx is used more often, which is the weight in grams of 10,000 m of yarn. Another example of weight numbering is denier, denoted den, in which the weight in grams of 9000 m of yarn is indicated. For yarns comprising filaments, denier weight numbering is also used for filaments. Last per filament or DPF refers to the weight number of one filament in the yarn.

The term "fraying" is used here to describe the phenomenon that the threads on the sides of a carpet become detached and clearly visible. Cutting a carpet causes a high risk of fraying. This is because during the cutting process, threads and/or connections between threads are cut; as a result, threads in the cutting plane may become loose more easily and clearly visible.

In a first aspect, the invention relates to a carpet tile or carpet strip that is suitable for the contract market, specifically office and commercial buildings.

According to an embodiment, the device comprises a machine or mechanically woven fabric, comprising a front side as a use surface and a back side, comprising warp and weft yarns of essentially 100% thermoplastic flame-retardant polyester (PES), a needle felt of essentially 100% thermoplastic flame-retardant polyester (PES), an intermediate layer between the needle felt and the machine or mechanically woven fabric, wherein some of the warp threads on the back side of the machine-woven or mechanically woven fabric have at least partially fused to each other.

The fabric consists of a front and a back side. The front side is the use surface on which passers-by in an office or commercial building walk and on which trolleys roll. After installation, it is the visible part of the carpet tile or carpet strip.

A woven fabric has the advantage over a tufted carpet that a base, such as a fabric or needle felt, is not required, whereby a pile thread is pierced. By the absence of a base in a fabric, the weight can be reduced compared to tufted carpet. In addition, tufted carpets are often long-pile, which makes it difficult to roll with carts. In addition, such long-pile mats wear out more quickly.

The fabric is preferably a smooth fabric. A pile fabric has the same disadvantage as a long pile tufted carpet when using trolleys. A pile fabric will wear out again more quickly. A second disadvantage of pile fabrics is that besides the pile yarn that is used to form the pile, the warp yarn also includes additional threads to bind the pile. As a result, the fabric becomes heavier compared to a smooth fabric.

The fabric preferably has a smooth bond. In a smooth bond, each weft thread extends alternately above and below a warp thread and each warp thread extends alternately above and below a weft thread. This is the simplest and strongest possible connection. The heavy daily loading of the fabric by passers-by in an office or commercial building and trolleys can pull the warp and weft threads apart and reduce the dimensional stability. A strong bond is advantageous to combat this. In addition, a strong bond will ensure that the warp and weft wires are less mobile relative to each other under the influence of the load of passers-by in an office or commercial building and trolleys, so that there is less friction between the wires and therefore less wear. This has no influence on the wear of the wires due to friction with e.g. the shoes of passers-by and the wheels of trolleys.

In another embodiment, the bond in the fabric is a weft thread. Each weft thread extends alternately over and under two juxtaposed warp threads and each warp thread alternately over and under a weft thread. This offers a different visual effect than with a smooth bond. Because the weft thread only runs above or below two juxtaposed warp threads in a weft loop, this is still a strong bond.

The fabric preferably has a limited number of floats, both upper and lower floats. Floats can be used in combination with different coloured yarns to weave patterns, emblems or indications into the fabric. The disadvantage of using floats is that it introduces a deviation from a smooth bond and therefore weakens the bond in the fabric locally. Floats preferably have a bond density of less than or equal to 5:1 and greater than or equal to 1:5, more preferably a bond density of less than or equal to 3:1 and greater than or equal to 1:3, and even more preferably less than or equal to 2:1 and greater than or equal to 1:2.

In one embodiment, the fabric is a Jacquard fabric. A Jacquard fabric comprises complex patterns and/or emblems which cannot be woven with frames on a weaving machine. Weaving with frames means that all the warp threads that are passed through a single frame, are located at each weft thread in the fabric either all at one side or all at the other side of the weft thread. A Jacquard fabric is woven using a Jacquard weaving machine. Jacquard allows an individual warp thread to be in a position on one side or the other of the weft thread, independent of the position of the other warp threads.

The fabric consists of warp and weft yarns of essentially 100% thermoplastic flame retardant polyester (PES). PES is very strong, is rigid, has good dimensional stability and low creep. It is therefore suitable for use under high load. The yarn is not attacked by mould and bacteria. This is advantageous because, for example, in an office or commercial building, coffee or other drinks can be spilled, which can lead to mould and bacteria. PES absorbs almost no liquids. It is well resistant to acids, oxidising agents and diluted alkaline detergents. It can be sterilised with steam. Thanks to these characteristics, the fabric is suitable for efficient and quick cleaning. This is advantageous for an office or commercial building due to the limited time available for a cleaning team.

Flame retardant PES has excellent heat resistance. It is hardly flammable, extinguishes flames and results in limited smoke development. Thanks to these characteristics, it is possible to meet at least the requirements for the Cfl-s1 classification according to the fire standard EN 13501-1 2007.

Flame retardant PES has excellent heat resistance. It is hardly flammable, extinguishes flames and results in limited smoke development. Thanks to these characteristics, it is possible to comply with FAR 25.853 regarding flammability.

The carpet tile or carpet strip consists of a needle felt of essentially 100% thermoplastic fire-resistant polyester (PES). Therefore, the needle felt meets at least the requirements for the classification Cfl-s1 according to the fire standard EN 13501-1 2007.

The carpet tile or carpet strip consists of a needle felt of essentially 100% thermoplastic flame retardant polyester (PES). Therefore, the needle felt meets the FAR 25.853 standard regarding flammability.

Needle felt is a non-woven textile. The needle felt has a thickness of 1 mm to 8 mm, preferably 1 mm to 6 mm, more preferably 1 mm to 5 mm and even more preferably 1 mm to 4 mm.

The needle felt is attached to the back of the fabric with the aid of the intermediate layer. Needle felt is suitable for mechanically reinforcing the fabric. It is suitable for providing rigidity to the carpet tile or carpet strip with sharp edges, for giving high dimensional stability to the carpet tile or carpet strip, for increasing the comfort of walking on the carpet tile or carpet strip and for improving the sound insulation and thus the acoustics in an office or commercial building.

Because needle felt is a non-woven textile, the carpet tile or carpet strip is suitable for quick installation and replacement in an office or commercial building. The carpet tile or carpet strip can be attached to a floor surface or raised floor by means of Velcro strips. The Velcro strips are glued to the floor surface or raised floor. The hooks of the Velcro strip are hooked into the threads of the needle felt, so that the carpet tile or carpet strip is secured. The carpet tile or carpet strip can easily be removed by pulling the carpet tile or carpet strip off the Velcro strip. Velcro strips are reusable and remain adhered to the floor surface or raised floor. A new carpet tile or carpet strip according to the invention can easily be installed by adhering the new carpet tile or carpet strip to the Velcro strips already present, so that the new carpet tile or carpet strip is immobilised. It is clear to the person skilled in the art that the carpet tile or carpet strip according to the present invention can also be installed by means of glue, double-sided adhesive or simply peeled off on the floor surface or raised floor.

A Velcro tape is made of a flame retardant material and meets the FAR 25.853 (a)(1)(ii) standard for flammability. A non-limited example of a suitable material is polyamide PA6. The weight is preferably less than 0.60 kg/m$^2$, more preferably less than 0.55 kg/m$^2$ and even more preferably less than 0.45 kg/m$^2$. The Velcro tape comprises hooks on one side of the tape configured to hook the threads and on the opposite side an adhesive. The adhesive has an adhesive strength of at least 10.0 N/cm, preferably at least 12.0 N/cm and even more preferably at least 13.0 N/cm. The force required to pull the carpet tile from the hooks of the Velcro strip is at least 0.60 N/cm, preferably at least 0.70 N/cm and even more preferably at least 0.80 N/cm. The shear force of the Velcro tape is at least 20 N/cm$^2$, preferably at least 25 N/cm$^2$ and even more preferably at least 29 N/cm$^2$. The loop tension is at least 5 N/cm$^2$, preferably at least 7 N/cm$^2$ and even more preferably at least 8 N/cm$^2$. A non-limited example of a suitable Velcro tape is HTH 577 from the company Velcro.

The fabric has a maximum weight of 1100 g/m$^2$. The needle felt has a maximum weight of 900 g/m$^2$. The middle layer weighs a maximum of 250 g/m$^2$. The total weight of a carpet tile or carpet strip is thus a maximum of 2250 g/m$^2$. A standard carpet tile or carpet strip can weigh up to 3000 g/m$^2$ or even more. This makes a carpet tile or carpet strip according to the invention suitable for use in an office or commercial building, in particular on a raised floor. The carpet tile or carpet strip is also more ergonomic for the installer to carry.

Some of the warp threads of the machine-woven or mechanically woven fabric have melted together at least partially on the back side. A warp thread has preferably fused over at least 10% of its length, more preferably over at least 20% of its length, even more preferably over at least 30% and even more preferably over at least 50% of its length with the juxtaposed warp threads. When a carpet tile or carpet strip is cut to size during installation or during the cutting of shapes in the carpet tile or carpet strip, at least some of the warp threads remain mutually bound, so that the strength and dimensional stability of the carpet tile or carpet strip is maintained and the carpet tile or carpet strip frays less at the cutting edge. This advantage also applies when cutting carpet tiles or carpet strips during the production process.

Because some of the warp threads have fused together, the warp threads can move relative to each other to a limited extent. As a result, there is less friction between the threads and therefore less wear. This strengthens the fabric and the carpet tile or carpet strip. In the case of carpet tiles or carpet strips according to the state of the art, the fabric is reinforced by applying a layer of adhesive or a fusion coating adhering to the knots of the fabric. The glue or fused coating must then penetrate between the threads of the fabric, so that more glue or fused coating is required than simply to attach the fabric to the needle felt. In the case of a carpet tile or carpet strip according to the invention, there is therefore an additional weight reduction compared to the state of the art. A further advantage is that the adhesive or fusion coating does not have to penetrate between the threads, so that it is easier to recycle the fabric threads and the needle felt.

According to one embodiment, some of the warp and weft yarns have then at least partially fused to each other at the edge of the carpet tiles or carpet strips. This further strengthens the cutting edge and further reduces the fraying of the cutting edge. It is not necessary to reinforce the edges of the carpet tiles or carpet strips with a stitch or an additional layer of adhesive or a coating on the edge, so that the weight is reduced.

Preferably in at least 10% of the crossings between the warp and weft threads, more preferably in at least 20% of the crossings between the warp and weft threads, even more preferably in at least 30% of the crossings between the warp and weft threads and even more preferably in at least 50% of the crossings between the warp and weft threads, the warp and weft threads have fused together.

According to one embodiment, the thread count of the warp and weft threads is 1100 dtex to 4400 dtex.

A higher yarn number means a heavier and thicker yarn. A high yarn number is indicated for heavy, strong fabrics with high dimensional stability. A low thread number is indicated for light and soft fabrics. A carpet tile or transport carpet is preferably light, strong and holds its shape under the daily load of passers-by in an office or commercial building. A yarn count of 1100 dtex to 4400 dtex, preferably 1500 dtx to 3700 dtex and even more preferably 1800 dtex to 3100 dtex is indicated for a carpet tile or carpet belt. The carpet tile or carpet strip is then sufficiently light and strong.

The weft and warp threads comprise filaments. To obtain a lightweight fabric, lightweight filaments are indicated. The filament has a weight number of 2 DPF to 20 DPF, preferably 2 DPF to 15 DPF, more preferably 2 DPF to 10 DPF and even more preferably 2 DPF to 5 DPF.

In an alternative embodiment, it is necessary to make the fabric stronger to achieve sufficient dimensional stability. In this case, slightly stronger filaments are indicated. The filament has a weight number of 2 DPF to 20 DPF, preferably 5 DPF to 20 DPF, more preferably 8 DPF to 20 DPF and even more preferably 10 DPF to 20 DPF.

According to one embodiment, weft and warp threads are so-called continuous filament threads and the threads comprise continuous filaments.

According to one embodiment, weft and warp yarns are so-called continuous filament yarns and the yarns comprise continuous filaments, wherein the texture of the yarns is modified with the help of air jets, in which small loops are formed. This provides extra insulation and strength.

In one embodiment, the number of warp threads per cm of fabric is between 8 and 30 and the number of weft threads per cm of fabric is between 3 and 10.

The number of warp threads per cm of fabric also determines the density of the fabric. A denser fabric will be stronger and have more dimensional stability, but it will also be heavier. With a lower number of warp threads per cm of fabric, the fabric is lighter and softer, but will be less strong and have less dimensional stability. The number of warp threads per cm of fabric is 8 to 30, preferably 13 to 25, more preferably 15 to 20. The carpet tile or carpet strip is then sufficiently light and strong.

The number of weft threads per cm of fabric also determines the density of the fabric. A denser fabric will be stronger and have more dimensional stability, but it will also be heavier. In case of a lower number of weft threads per cm of fabric, the fabric is lighter and softer, but it will be less strong and have less dimensional stability. The number of weft threads per cm of fabric is 3 to 10, preferably 3 to 8, more preferably 3 to 7. The carpet tile or carpet strip is then sufficiently light and strong.

In one embodiment, the weight per unit area of the carpet tile or carpet strip is a maximum of 2000 $g/m^2$.

The weight of the carpet tile or carpet strip is determined by the weight of the fabric, the middle layer and the needle felt. The weight of the carpet tile or carpet strip can be optimised by careful selection of the fabric, middle layer and needle felt. A heavier fabric is inherently stronger and requires a thinner needle felt for good dimensional stability. Because some of the warp threads of the mechanically woven fabric have at least partially fused to each other on the back side, the intermediate layer is minimal. The intermediate layer is the connection between the fabric and the needle felt. A lighter fabric requires a slightly thicker needle felt for good dimensional stability. The middle layer can always be minimal. With a good choice of fabric thickness, determined by the thread number, the number of warp threads per cm of fabric and the number of weft threads per cm of fabric, and a suitable needle felt, the weight of the carpet tile or carpet strip is a maximum of 2000 $g/m^2$, preferably a maximum of 1900 $g/m^2$, even more preferably a maximum of 1800 $g/m^2$ and even more preferably 1700 $g/m^2$.

In one embodiment, the machine-woven or mechanically woven fabric and the needle felt are laminated to each other with the aid of the intermediate layer.

The machine-woven or mechanically woven fabric and the needle felt are mutually bound. The needle felt provides dimensional stability and strengthens the fabric because it is bonded to the fabric. The fabric and the needle felt are laminated to each other with the aid of the intermediate layer.

In one embodiment, the intermediate layer comprises the PES adhesive.

By using PES as an adhesive, the carpet tile or carpet strip can be easily recycled. Both the fabric, the needle felt and the adhesive in the middle layer contain PES, so that the complete carpet tile or carpet strip can be recycled collectively. It is not necessary to separate the fabric and needle felt. The PES adhesive is for example a PES fusion adhesive film, a PES fusion powder or other suitable means.

According to one embodiment, the carpet tile or carpet strip comprises reactive molecules to form thermoreversible covalent interactions in the intermediate layer.

In this embodiment, covalent interactions are reversed by heating the carpet tile or carpet strip. This contributes to a simple recycling of the carpet tile or carpet strip. By reversing the reaction between the reactive molecules, the original bonding structure in the intermediate layer, binding the fabric and the needle felt, breaks down into smaller molecules. These smaller molecules can be more easily removed from the fabric and needle felt than a traditional glue or fusion coating. For example, it is possible to dissolve the remaining smaller molecules in a mild solvent and then recover these molecules from the solvent. Another possibility is to recycle the molecules together with the fabric and/or needle felt, for example by mixing the molecules with the threads of the fabric and/or needle felt filament.

Thermo-reversible covalent reactions are already known to chemistry. A non-exhaustive list of examples are Michael reactions, nitroso dimerisation reactions, cyclic anhydride reactions in which ester compounds are formed, urethane formation reactions, aliphatic ion formation reactions and phenol-azlactone adduction formation reactions.

According to another embodiment, the reaction is between a first molecule, comprising a conjugated diene group and a second molecule comprising a dienophyl group. Such reactions between a conjugated diene group and a dienophyl group are referred to as Diels-Alder reactions. The advantage of Diels-Alder reactions is that thermal reversibility can occur at relatively low temperatures. This can prevent possible physical and chemical damage to the fabric and needle felt.

A conjugated diene is an acyclic hydrogen with a molecular structure comprising two hydrogen-hydrogen double compounds, separated by a single compound. The conjugated diene group may be part of a molecule comprising atoms other than carbon and hydrogen. A dienophyl is the alkene component (double compound of carbon) of a reaction between an alkene and a diene. The dienophyl group can be part of a molecule containing atoms other than carbon and hydrogen.

According to another embodiment, the diene group is a furan (such as furfuryl), anthracene, thiophene or pyrrole. The dienophyl group is a maleimide, fumarate, maleate or alkylene. These groups are suitable for use in the invention. Clearly, this embodiment does not preclude the use of other diene groups and/or dienophyl groups.

In one embodiment, some of the weft yarns on the back side of the machine-woven or mechanically woven fabric have at least partially merged with some of the warp yarns.

Because some of the weft threads have merged with the warp threads, the weft and warp threads can move relative to each other to a limited extent. Some of the nodes of the weft and warp threads are therefore fixed. This increases the dimensional stability and reduces the friction between the mutual threads and thus also the wear. This strengthens the fabric and the carpet tile or carpet strip. In a solution for reinforcing a fabric according to the state of the art, the fabric is reinforced by applying a layer of adhesive or a fusion coating adhering to the knots of the fabric. The glue or fused coating must then penetrate between the threads of the fabric, so that more glue or fused coating is required than simply attaching the fabric to the needle felt. In the case of a carpet tile or carpet strip according to the invention, there is therefore an additional weight reduction compared to the state of the art. A further advantage is that the adhesive or fusion coating does not have to penetrate between the threads, so that it is easier to recycle the fabric threads and the needle felt.

In one embodiment, the carpet tile or carpet web comprises a membrane of essentially 100% polyester (PES) between the machine or mechanically woven fabric and the intermediate layer.

The membrane is also a non-woven textile. It is very thin. The thickness of the membrane is at most 0.5 mm, preferably at most 0.3 mm, even more preferably at most 0.2 mm, and even more preferably at most 0.1 mm. The weight of the membrane is at most 150 g/m², preferably at most 100 g/m², even more preferably at most 50 g/m², and even more preferably at most 40 g/m².

A 100% polyester (PES) membrane guarantees the complete recycling of the carpet tile or carpet strip.

Because of the limited dimensions of a carpet tile, the dimensional stability of machine or mechanically woven fabric may be more limited than that of a carpet. As a result, it is possible for a carpet tile to shrink after installation, causing visible joints between the carpet tiles. This is also the case with a carpet strip in a direction transverse to the longitudinal direction of the carpet strip. As a result of the shrinkage of a carpet strip after installation, the passages between the carpet strips are more visible. A membrane between the machine-woven or mechanically woven fabric and the intermediate layer is suitable for increasing the dimensional stability of the carpet tile or carpet strip in all directions parallel to the working surface of the carpet tile or carpet strip.

In a second aspect, the invention relates to a method for the manufacture of a carpet tile or carpet strip suitable for the contract market, in particular office and commercial buildings.

According to an embodiment, the method comprises the steps of machine weaving a fabric, comprising a front side as a use surface and a back side, comprising warp and weft yarns of essentially 100% thermoplastic flame retardant polyester (PES), manufacturing a needle felt of essentially 100% thermoplastic flame retardant polyester (PES), laminating the needle felt to the fabric by means of an intermediate layer, cutting to carpet tiles or carpet strips, wherein the method comprises the further step before the lamination of leading the needle felt to the fabric, and lamination of the needle felt to the fabric with the aid of an intermediate layer, cutting to carpet tiles or carpet strips, wherein the method comprises the additional step prior to lamination of leading the back side of the fabric along a heated surface to at least partially melt some of the warp threads on the back side of the machine-woven or mechanically woven fabric.

The fabric preferably has a maximum weight of 1100 g/m². The needle felt has a maximum weight of 900 g/m². The middle layer has a maximum weight of 250 g/m².

The machine weaving of fabrics using a loom is known in the state of the art.

The formation of a needle felt from filaments is known in the state of the art. This can be done in two ways: a continuous method and a discontinuous method. In the case of the continuous method, filaments are formed directly in an uninterrupted process by extrusion from grains, a needle felt is formed and filaments are bound into the needle felt. In the case of the discontinuous method, the filament yarns are fed to a needle felt machine from spools. There, the filament yarns are opened, formed into the desired shape of needle felt and then bound. Preferably, a mechanical method is used for binding the filaments into the needle felt. An example is the needling of the needle felt with needles with barbs. By needling, the filaments are mixed, but there are also still many loose filament ends or loops that can get caught in the hooks of the Velcro tape when attaching to a floor surface or raised floor. Chemical reinforcement of needle felt is less preferred as it may influence the recycling of needle felt. Thermal reinforcement of the needle felt can reduce the number of loops or loose filament ends that can be caught by the hooks of a Velcro tape.

The needle felt is laminated to the fabric. For the lamination phase, the back side of the fabric is directed through a heated surface to at least partially melt some of the warp threads to each other. The fabric is directed through a series of support rolls.

Between two support rollers there is a heated surface. The heated surface pushes against the back side of the fabric. The heated surface is preferably adjustable so that it can push more or less against the back side of the fabric. The back side here indicates a side of the fabric and not the position of the heated surface relative to the fabric. The heated surface may be positioned horizontally or vertically, above, below, to the left or right, in front of or under the fabric. It is clear to the skilled person how the arrangement of the support rollers and the orientation of the fabric should be adapted so that the heated surface pushes against the back of the fabric.

In one embodiment, the heated surface is a hot plate, a hot roller, a metal sheet with a tip, another suitable surface or a combination of the above.

Because the fabric is led with its backside through the heated surface, some of the warp threads melt at least partially to each other. By pushing the heated surface more or less against the warp threads, the degree of melting of the warp threads can be changed. Other influencing parameters are the temperature of the heated surface and the speed with which the fabric is directed through the heated body.

The fabric can be directed through one, two, three or more heated bodies, depending on the desired degree to which some of the warp threads have fused together.

On the other side of the fabric, facing the heated body, an additional support roller can be positioned. This support roller supports the fabric while the heated body pushes against the back side of the fabric. By using a support roller facing the heated body, it is possible to push the heated surface more strongly against the fabric without the fabric tearing.

In one embodiment, the lamination comprises the use of PES as an adhesive in the intermediate layer.

In one embodiment, a PES melt-adhesive film is used during lamination. The fabric is unwound from a first roll, the PES fusion self-adhesive film from a second roll and the needle felt from a third roll. The fabric, the self-adhesive film and the needle felt are joined together, where the self-adhesive film touches the back of the fabric and the needle felt. The whole is heated so that the PES melt-adhesive film becomes sticky and is pressed together between two rollers. After cooling, the fabric and the needle felt are joined together by the self-adhesive film. The self-adhesive film forms an intermediate layer.

In one embodiment, a PES melt powder is used during lamination. The fabric is unwound from a first roll and the needle felt from a second roll. The PES melt powder is dispensed by means of a suitable dispenser through either the back side of the fabric or one side of the needle felt or the back side of the fabric and one side of the needle felt. The fabric and needle felt are joined together, where the back side of the fabric faces the needle felt and the PES melt powder is between the fabric and the needle felt. This is heated so that the PES fusing powder becomes sticky and is pressed together between two rollers. After cooling, the fabric and the needle felt are joined together with the PES fusion powder. The PES fusion powder forms an intermediate layer.

In one embodiment, the lamination comprises the use of reactive molecules to form thermoreversible covalent interactions in the interlayer.

According to one embodiment, a composition comprising reactive molecules A is applied to the back side of the fabric. To a face of the needle felt, a composition comprising reactive molecules B is applied. The fabric and the needle felt are assembled, wherein the back side of the fabric and the side of the needle felt with the composition thereon touch each other and wherein the circumstances are such that the molecules A and B react and thus form thermoreversible covalent interactions. A thin intermediate layer is formed which connects the fabric and the needle felt.

According to another embodiment, a composition comprising reactive molecules B is applied to the back side of the fabric. To one side of the needle felt, a composition comprising reactive molecules B is also applied. The fabric and the needle felt are assembled, wherein the back side of the fabric and the side of the needle felt with the composition thereon are oriented towards each other. Between the fabric and the needle felt, a thin intermediate layer comprising reactive molecules A is applied. The circumstances are such that the molecules A and B react and thus form thermoreversible covalent interactions. The thin intermediate layer connects the fabric and the needle felt.

In one embodiment, the method comprises the further step prior to lamination of directing the backside of the fabric along a heated surface to at least partially melt some of the weft yarns at the backside of the machine-woven or mechanically woven fabric or with some of the warp yarns.

By increasing the temperature of the at least one heated surface, or as a result of the speed with which the fabric is directed along the heated surface, or as a result of, for example, the pressure with which the heated surface pushes against the back side of the fabric, it is possible to melt at least partially not only a part of the warp threads, but also to melt at least a part of the weft threads to the warp threads. If a carpet tile or carpet strip is cut to size during installation or during the cutting of shapes in the carpet tile or carpet strip, at least some of the warp and weft threads remain bound to each other, so that the strength and dimensional stability of the carpet tile or carpet strip is maintained and the carpet tile or carpet strip frays less at the cutting edge. This advantage also applies when cutting carpet tiles or carpet strips during the production process.

In addition, it provides an even stronger fabric, in which the weft and warp threads are less mobile in relation to each other, which reduces mutual friction and thus wear.

According to one embodiment, cutting to carpet tiles or carpet strips comprises at least partially melting some of the warp and weft threads at the edge of the carpet tiles or carpet strips.

For cutting down to the carpet tiles or carpet strips, several solutions are known. The cut can be made with traditional scissors, whether automated or not, or with a rotating cutting blade, preferably circular or of any other suitable shape, or an ultrasonic cutting machine, or with a heated filament or knife, in which the heated filament or knife cuts through the melted carpet tiles or carpet strips.

Due to the heated filament or knife, some of the warp and weft threads have at least partially melted together at the edge of the carpet tiles or carpet strips. This further strengthens the cutting edge and further reduces the fraying of the cutting edge. It is not necessary to reinforce the edges of the carpet tiles or carpet strips with a stitch or an additional layer of adhesive or a coating on the edge, so that the weight is reduced.

According to one embodiment, after cutting to the carpet tiles or carpet strips using for example conventional scissors, a rotating cutting blade, or an ultrasonic cutting machine, some of the warp and weft threads have at least partially fused to each other at the edge of the carpet tiles or carpet strips using a filament, a heated knife, a laser, or any other suitable device. As a result, the same edge-reinforcing effect is achieved as when using a filament or heated knife for cutting to the carpet tiles or carpet strips.

According to an embodiment, the method comprises the additional step during lamination of laminating a substantially 100% polyester (PES) membrane to the backside of the woven fabric by machine or mechanically.

The lamination of the membrane to the back side of the mechanically woven fabric is done after the warp threads have been at least partially melted or the warp and weft threads have been at least partially melted.

In one embodiment, the lamination of the membrane comprises the use of PES as an adhesive. This ensures that the carpet tile or carpet strip is completely recyclable.

In one embodiment, the lamination of the membrane comprises the use of reactive molecules to form thermoreversible covalent interactions between the backside of the fabric and the membrane. This ensures that the carpet tile or carpet web is completely recyclable.

As a result of the lamination of the membrane to the back side of the fabric, the dimensional stability of the carpet tile or carpet web is increased in all directions parallel to the working surface of the carpet tile or carpet web.

In a third aspect, the invention relates to the manufacture of a carpet tile or carpet strip according to the first aspect, using a method according to the second aspect.

It will be clear to the person skilled in the art that a carpet tile or carpet strip according to the present invention can not only be used in office and commercial buildings, but also in other buildings such as hospitals, schools and even houses.

The present invention is now described in more detail with reference to the non-limiting examples or figures.

FIGURE DESCRIPTION

FIG. 1 shows a section of an embodiment of the present invention.

A polyester carpet tile or carpet web comprises a needle felt 1, which is laminated to a smooth fabric 6 by means of an intermediate layer 2. The intermediate layer 2 comprises PES adhesive or reactive molecules to form thermoreversible covalent interactions. The smooth fabric 6 comprises a first group of warp threads 3 and a second group of warp threads 4. The warp yarns 3 and 4 are juxtaposed alternately in the longitudinal direction of the fabric. The smooth fabric 6 comprises weft threads 5. The weft threads 5 lie transversely to the direction of the warp threads 3 and 4. A first weft thread 5 lies below the warp threads 3 and above the warp threads 4. The next weft thread 5 then lies above the warp threads 3 and below the warp threads 4. The fabric is then built up in this way. The resulting bond is a flat bond. A weft repeat can be obtained in a similar way if groups of two warp threads 3 and groups of two warp threads 4 are juxtaposed alternately in the longitudinal direction of the fabric. Some of the warp threads 3 and 4 have at least partially fused to each other at the back side of the smooth fabric 6. This is shown in FIG. 1. Preferably, a part of the warp threads 3 and 4 have fused at least partially at the back side of the smooth fabric 6 to a part of the weft threads 5. Preferably, a part of the warp threads 3 and 4 and a part of the weft threads 5 have fused to each other at least partially at the edges of a polyester carpet tile or carpet strip.

Figure 2:
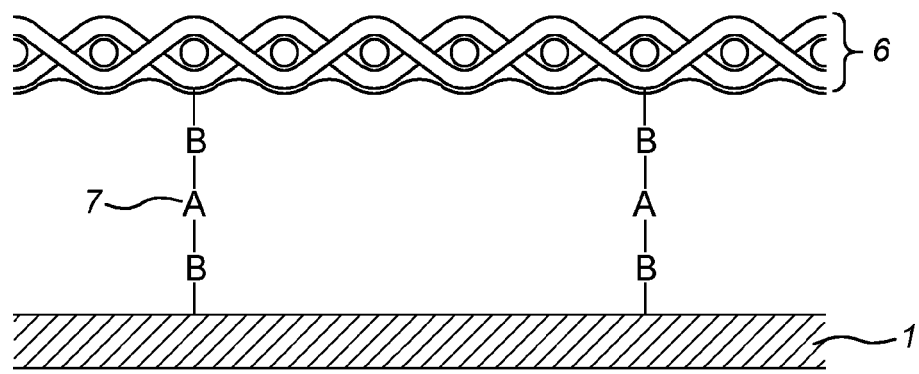
FIG. 2 shows schematically a molecular model of a bond between a fabric and a needle felt according to one embodiment of the present invention.

FIG. 2 shows schematically a molecular model of a bond between a fabric and a needle felt according to one embodiment of the present invention.

A composition comprising reactive molecules B is applied to the back side of the fabric 6 and to one side of the needle felt 1. The back side of the fabric 6 and the side with the applied composition comprising reactive molecules B on it of the needle felt 1 are brought together, with an intermediate layer with reactive molecules A between these sides. After the reaction between the molecules A and B has taken place, a bond 7 between the fabric 6 and the needle felt 1 is formed. The bond 7 makes use of the covalent interactions between the molecules A and B.

Figure 3:
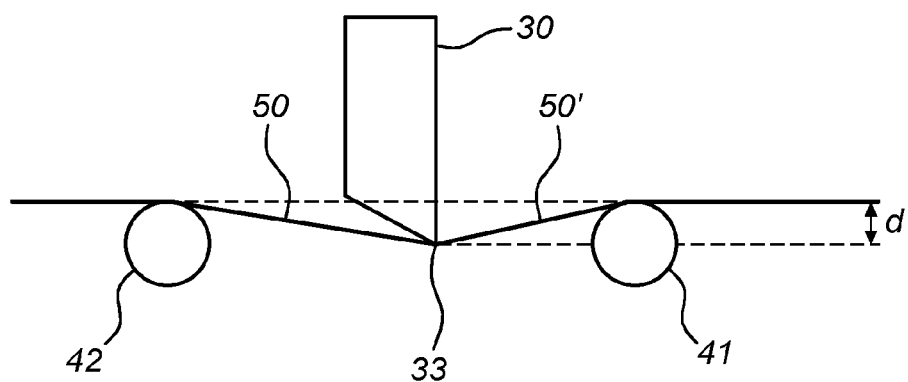
FIG. 3 shows a device suitable for at least partially fusing some of the warp threads to each other according to one embodiment of the method of the present invention.

FIG. 3 shows a device suitable for at least partially fusing some of the warp threads to each other according to one embodiment of the method of the present invention. The fabric 50' is directed through support rolls 41 and 42. The direction is from support roller 41 to support roller 42. Between the two support rollers 41 and 42, the heated surface 30 is located. The heated surface pushes with a point 33 against the back side of the fabric 50'. Some of the warp threads have at least partially melted together at the back side of the fabric 50'. The melted warp threads are distributed to an essentially flat surface by the movement through the tip 33 of the heated surface 30. They then cool and form the fabric 50, which is stronger, has greater dimensional stability and is more resistant to wear and tear and less frayed at the edges than the fabric 50'.

The heated surface 30 can be moved over a distance d. This distance d is, for example, from 0 mm to 50 mm. By taking a distance d greater than 0 mm, the tip 33 of the heated surface 30 pushes against the back side of the fabric. The required distance d is determined by the desired result of at least partial melting of a part of the warp threads, together with the temperature of the heated surface 30 and its tip 33, the speed at which the fabric 50' is directed through the tip 33 and the fabric 50' itself. If a fabric 50' is not resistant to a large distance d, other variations of the parameters speed, distance d and temperature of the heated surface 30 and its tip 33 are possible to achieve the desired result.

Figure 4:
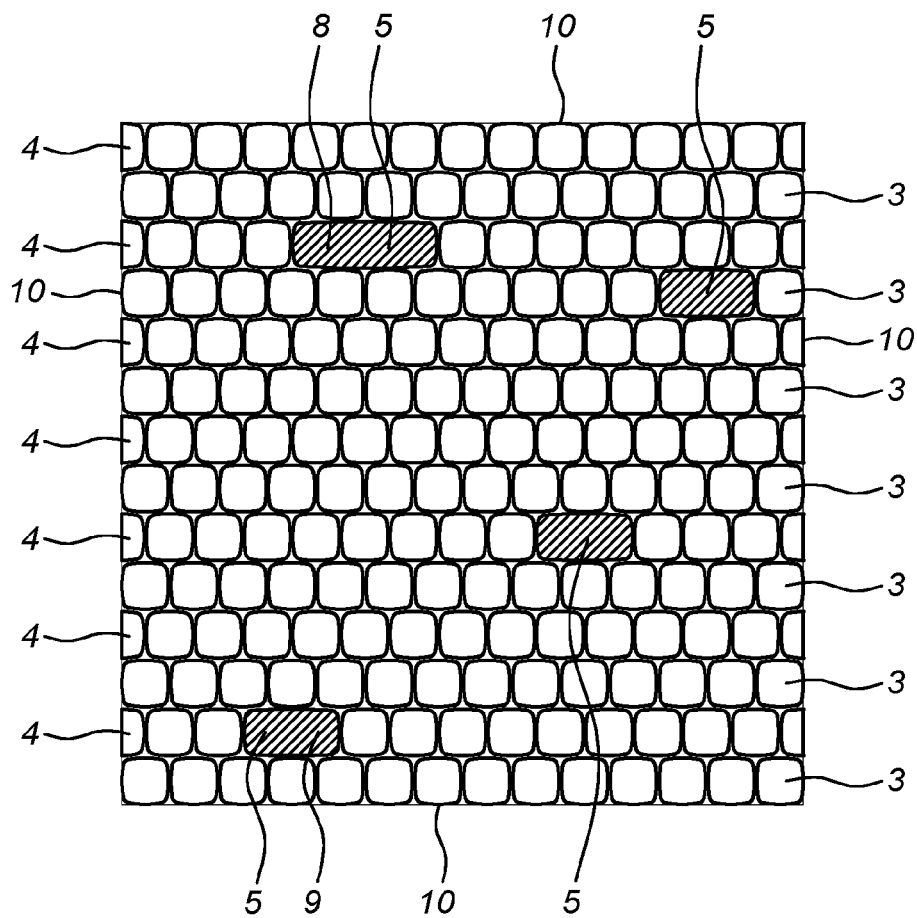
FIG. 4 shows a top view of an embodiment of the present invention.

FIG. 4 shows a top view of an embodiment of the present invention.

A polyester carpet tile comprises a needle felt 1, which is laminated to a smooth fabric 6 by means of an intermediate layer 2. The smooth fabric 6 comprises a first group of warp threads 3 and a second group of warp threads 4. The warp threads 3 and 4 are juxtaposed alternately in the longitudinal direction of the fabric. The smooth fabric 6 comprises weft threads 5. The weft threads 5 lie transversely to the direction of the warp threads 3 and 4. A first weft thread 5 lies below the warp threads 3 and above the warp threads 4. The weft thread 5 is completely hidden by the warp threads 3 and the warp threads 4 are completely hidden by the warp threads 3 and the weft threads 5. The next weft thread 5 is then located above the warp threads 3 and below the warp threads 4. The weft thread 5 is completely hidden by the warp threads 4 and the warp threads 3 are completely hidden by the warp threads 4 and the weft threads 5. The fabric is then formed in this way. The resulting bond is a flat bond.

In some places, there has been a local deviation from the smooth bond. Top float 9 is formed by a bonding pattern with a warp:weft bonding density of 2:1. Weft 5 floats above two warp threads 4. Top float 8 is formed by a binding pattern with a warp:weft binding density of 3:1. Weft 5 floats over three warp 4 threads.

Some of the warp threads 3 and 4 have fused together at least partially at the back side of the smooth fabric 6. Preferably, a part of the warp threads 3 and 4 have fused at least partially at the back side of the smooth fabric 6 to a part of the weft threads 5. Preferably, a part of the warp threads 3 and 4 and a part of the weft threads 5 have at least partially fused to each other at the edges 10 of the polyester carpet tile. This is for example possible by using a filament when cutting to the carpet tiles. This provides straight edges and the cut warp and/or weft threads fray less or not at all.

It is clear to the skilled person that this example also applies to carpet strips.

EXAMPLES

The invention will now be described using, but not limited to, the following example.

The example relates to an embodiment of a polyester carpet tile or carpet strip suitable for the contract market, more particularly office and commercial buildings, according to the invention. The carpet tile or carpet strip comprises a smooth fabric, an intermediate layer and a needle felt.

Both the smooth fabric and the needle felt comprise 100% flame retardant PES. The middle layer contains a PES adhesive. Therefore, the carpet tile or carpet strip is 100% recyclable in a simple way after it has been replaced by a new carpet tile or carpet strip in the office or commercial building.

Needle felt is a non-woven textile. On the floor surface or the raised floor in the office or commercial building, Velcro strips of type HTH577 are glued. The many loose filament ends or loops in the needle felt get caught in the hooks of the Velcro tape. Therefore, the carpet tile or carpet strip can be quickly installed and also replaced on the floor surface or raised floor. The carpet tile or carpet strip must simply be torn off the Velcro strips and the new carpet tile or carpet strip must be adhered to the Velcro strip. There are no adhesive residues on the floor surface or raised floor that need to be removed. There are no glue residues on the needle felt either, which simplifies recycling. It is clear to the person skilled in the art that the carpet tiles or carpet strips according to the present invention can also be installed by means of glue, double-sided adhesive or simply peeled off on the floor surface or raised floor.

The fabric consists of warp and weft yarns with a yarn count of 2200 dtex. The yarns have an average breaking elongation of 30% and a minimum tensile strength of 3 g/den, tested according to ISO 2062. The average boil shrinkage of the yarns is, according to ISO 12590, 1.5%. There are 17 warp threads per cm of fabric and 5 weft threads per cm of fabric. This results in a strong fabric, which is also light. The weight of the fabric is limited to 570 g/m$^2$.

Another example of a fabric consists of warp and weft threads with a thread number of 3300 dtex. There are 17 warp threads per cm of fabric and 6 weft threads per cm of fabric. The weight of the fabric in this case is limited to 950 g/m$^2$.

Some of the warp and weft threads have at least partially fused to each other on the back side of the fabric. This strengthens the fabric and increases the dimensional stability. When cutting carpet tiles or carpet strips, the edges will not fray or hardly fray at all. Also when cutting to size or cutting shapes in carpet tiles or carpet strips during installation, the carpet tile or carpet strip will fray less at the cutting edges.

The warp and weft wires are less mobile in relation to each other, which leads to less friction between the warp and weft wires and therefore also less wear and tear during the daily loading of passers-by in the office or commercial building and trolleys.

Because the fabric is stronger and has greater dimensional stability as a result of the at least partial melting of the warp and weft threads, it is not necessary to use glue to fix the knots between the warp and weft threads. The intermediate layer, comprising glue, is therefore lighter. The weight of the middle layer is limited to 130 g/m$^2$.

The carpet tiles or carpet strips are cut from the carpet using an ultrasonic cutting machine. Afterwards, at the cutting edge, some of the weft threads and some of the warp threads are at least partially fused together using a laser. This further strengthens the cutting edge and further reduces the fraying of the cutting edge. It is not necessary to reinforce the edges of the carpet tiles or carpet strips with a stitch or an additional layer of glue or a coating on the edge, so that the weight is reduced. Needle felt is suitable for giving the necessary dimensional stability to the carpet tile or carpet strip. Needle felt is suitable for increasing the walking comfort of passers-by in office or commercial buildings and for use as sound insulation. Because the fabric is stronger as a result of at least partial melting of the warp and weft threads, the fabric already has a certain dimensional stability. Therefore, it is possible to use a thinner needle felt for the carpet tile or carpet strip. The needle felt has a maximum weight of 150 g/m$^2$. The total weight per unit area of the carpet tile or carpet strip is then 850 g/m$^2$.

The carpet tile or carpet strip has been tested in accordance with FAR 25.853 for flammability, specifically FAR 25.853(A)-App. F Part I para (a)(1)(ii) Measurement of flammability of aircraft material. The test was conducted in a draft-free cabinet in accordance with Federal Test Method Standard 191, Method 5903.2. Three samples of the 75 mm by 305 mm carpet tile or carpet strip were exposed for 60 s to a Bunsen burner flame with a temperature of at least 843° C. The samples were suspended vertically in their longitudinal direction 20 mm above the tip of the Bunsen burner. The flame of the Bunsen burner has a height of 40 mm measured from the tip of the burner. The carpet tile or carpet strip then burned for an average of no more than 2 s over a length and width of less than 80 mm. There were no burning parts of the carpet tile or carpet strip falling off. Therefore, the carpet tile or carpet strip meets the standard, which requires that, after removal of the flame, the carpet tile or carpet strip continues to burn for a maximum of 15 s, that the carpet tile or carpet strip burns for a maximum length of 152 mm and that burning parts of the carpet tile or carpet strip burn for a maximum of 5 s.

The carpet tile or carpet strip meets at least the requirements for classification Cfl-s1 according to the fire standard EN 13501-1 2007.

The carpet tile or carpet strip was subjected to a Vetterman test and a Lisson test. The Vetterman test simulates wear under laboratory conditions. The Lisson test determines the loss of mass and the bonding of fibres or threads, after the carpet tile or carpet belt has been subjected to a prescribed number of double passes of a quadruped wheel. In both tests, the carpet tile or carpet belt achieved the highest classification of 33, which means that it is suitable for heavy duty use.

The carpet tile or carpet strip is also tested according to and meets the EN 15114 standard for the determination of shear strength, the EN 985 standard for the test method of office chairs, the ISO 6356 standard for the tendency to form static electricity in textile and laminate floor coverings and the ISO 2551 standard for the determination of dimensional changes as a result of varying water and heat conditions. Compliance with all these standards ensures that the carpet tile or carpet strip is suitable for the daily load of passers-by in the office or commercial building and trolleys.

The invention claimed is:

1. A carpet tile or carpet strip suitable for the contract market, particularly office or commercial buildings, comprising
    a mechanically woven fabric, comprising a front side as a use surface and a back side, comprising warp and weft yarns of substantially 100% thermoplastic flame retardant polyester (PES),
    a needle felt of essentially 100% thermoplastic flame retardant polyester (PES),
    an intermediate layer between the needle felt and the mechanically woven fabric,
        wherein some of the warp threads on the back side of the mechanically woven fabric have at least partially fused to each other.

2. The carpet according to claim 1, wherein the thread number of the warp and weft threads is 1100 dtex to 4400 dtex.

3. The carpet according to claim 1, wherein the number of warp threads per cm of fabric is 8 to 30 and the number of weft threads per cm of fabric is 3 to 10.

4. The carpet according to claim 1, wherein the weight of the carpet tile or the carpet strip is at most 2000 g/m$^2$.

5. The carpet according to claim 1, wherein the mechanically woven fabric and the needle felt are laminated to each other with the aid of the intermediate layer.

6. The carpet according to claim 1, wherein the intermediate layer comprises a PES adhesive.

7. The carpet according to claim 1, wherein the carpet tile or carpet strip comprises reactive molecules for the formation of thermoreversible covalent interactions in the intermediate layer.

8. The carpet according to claim 1, wherein some of the weft yarns on the back side of the mechanically woven fabric has at least partially fused with some of the warp yarns.

9. The carpet according to claim 1, wherein the carpet tile or carpet strip comprises a membrane of essentially 100% polyester (PES) between the mechanically woven fabric and the intermediate layer.

10. A method of manufacturing a carpet tile or carpet strip suitable for the contract market, particularly office or commercial buildings, comprising:
    the mechanical weaving of a fabric, comprising a front side as a use surface and a back side, comprising warp and weft yarns of substantially 100% thermoplastic flame retardant polyester (PES),
    the manufacture of a needle felt of essentially 100% thermoplastic flame retardant polyester (PES),
    the lamination of the needle felt to the fabric with an intermediate layer,
    the cutting of carpet tiles or carpet strips,
        wherein the method comprises the further step prior to lamination of directing the backside of the fabric along a heated surface to at least partially melt some of the warp threads at the backside of the mechanically woven fabric together.

11. The method according to claim 10, wherein the lamination comprises the use of PES as an adhesive in the intermediate layer.

12. The method according to claim 10, wherein the lamination comprises the use of reactive molecules to form thermoreversible covalent interactions in the interlayer.

13. The method according to claim 10, wherein the method comprises the additional step before lamination of directing the backside of the fabric along a heated surface to at least partially melt some of the weft yarns at the backside of the mechanically woven fabric with some of the warp yarns.

14. The method according to claim 10, wherein the cutting to carpet tiles or carpet strips comprises melting at least part of the warp and weft threads at the edge of the carpet tiles or carpet strips.

15. The method according to claim 10, wherein the method comprises the additional step during lamination of laminating a membrane of essentially 100% polyester (PES) to the backside of the mechanically woven fabric.

\* \* \* \* \*